Nov. 1, 1960

P. JOHNSON 2,958,233

VALVE INDEXING MECHANISM

Filed Nov. 27, 1957

INVENTOR.
PAUL JOHNSON
BY
Oberlin & Limbach
ATTORNEYS

Nov. 1, 1960 P. JOHNSON 2,958,233
VALVE INDEXING MECHANISM
Filed Nov. 27, 1957 2 Sheets-Sheet 2

INVENTOR.
PAUL JOHNSON
BY
Oberlin & Limback
ATTORNEYS

United States Patent Office 2,958,233
Patented Nov. 1, 1960

2,958,233

VALVE INDEXING MECHANISM

Paul Johnson, Lorain, Ohio, assignor to The Thew Shovel Company, Lorain, Ohio, a corporation of Ohio Filed Nov. 27, 1957, Ser. No. 699,362

6 Claims. (Cl. 74—471)

The present invention relates generally as indicated to a valve indexing mechanism and more particularly to a detent or friction mechanism operative to hold a universally tiltable valve actuator or joy stick in any one or all of its tilted operating positions.

For instance, in the art of crane and power shovel control it is a conventional practice to provide a circular series of valves which, when the stems thereof are selectively depressed, establish flow of fluid to selectively actuate fluid motors for hoisting, swinging, transmission control, and other movements of the crane or shovel or their components. Furthermore, it is desired for certain controls to index or to hold the joy stick so that a hand of the operator will be free to manipulate other control devices.

It is a principal object of this invention to provide a versatile indexing mechanism which may be readily associated with any one, with several, or with all of the circularly arranged series of valves, the universally mounted valve actuator or joy stick having a plate thereon which cooperates with the indexing mechanism to hold the joy stick in any selected tilted valve actuating position.

It is another object of this invention to provide a detent mechanism which may be quickly made inoperative so that any selected valve, when actuated, will automatically return to its initial condition thereby returning the joy stick to neutral position upon release of tilting force on the joy stick.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
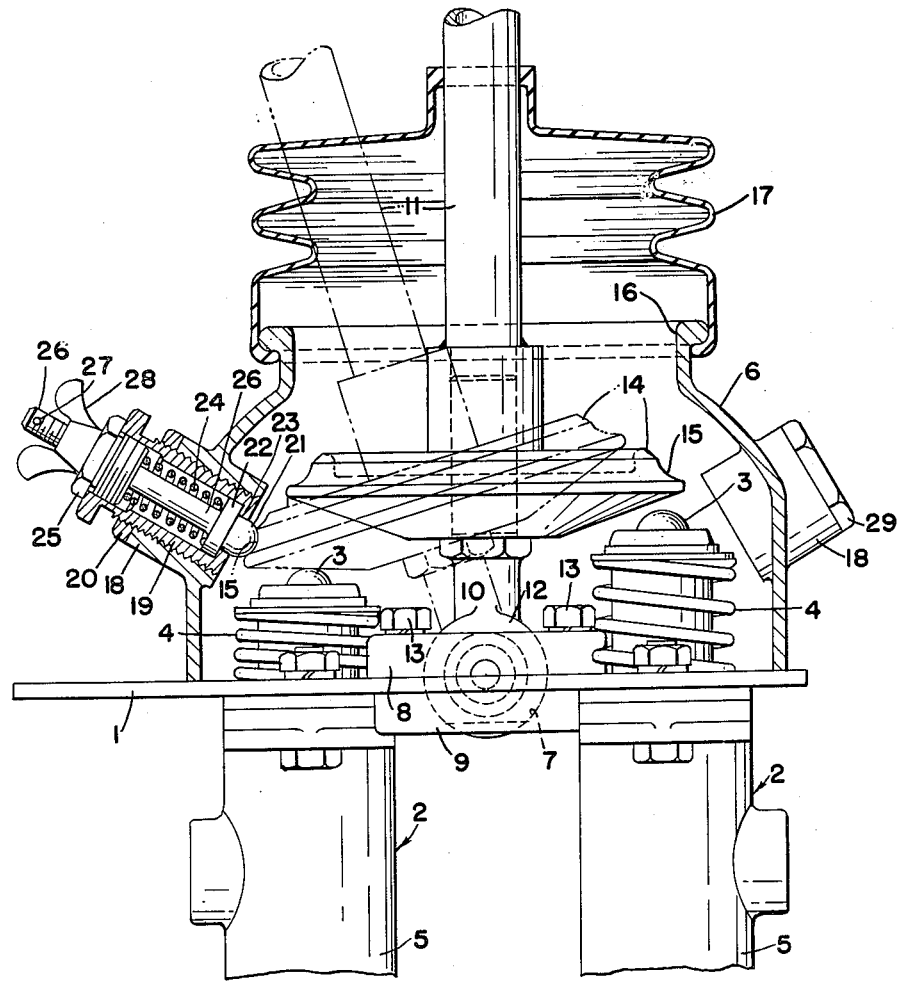
Fig. 1 is a central vertical cross-section view through a preferred embodiment of the invention.

Referring now more particularly to the drawing, the reference numeral 1 denotes the cover plate of a hydraulic control box (not shown) and mounted on said cover plate are a circularly arranged series of valves 2, only two being shown herein, but usually four equally spaced valves 2 will be provided. Obviously, any number of valves 2 may be provided and often the spacing thereof is such that two or more valves may be simultaneously actuated by a vector movement of the actuator between said valves.

Each valve 2 is shown as being provided with a valve stem 3 which has an upper rounded end and around the valve stem assembly is a compression spring 4 which normally tends to urge the valve stem 3 upwardly with respect to the valve body 5 to thereby block the flow of fluid from one port to the other.

A housing 6 is bolted or otherwise secured on said cover plate 1 and in the center of the housing 6 and centrally of the valves 2 there is provided a spherical socket 7 as defined by a plate 8 and the boss 9 of the cover plate. Screws 13 hold the plate 8 in place. The stud 10 of the joy stick 11 has a spherical end 12 that has universal angular tilting motion in the socket 7.

The joy stick or valve actuator 11 extends upwardly and has, above the spherical end 12 of the stud 10, a plate 14. The bottom side of said flange 14 is frusto-conical and is adapted to contact any selected valve stem 3 when the joy stick 11 is swung to a selected tilted position, as shown in dash lines in Fig. 1, for example. The plate 14 is formed with a peripheral groove 15 which, as to be presently explained, cooperates with spring-pressed detents associated with any one or more of the respective valves 2 for yieldably holding the joy stick 11 at its respective tilted positions. Thus, if a particular valve 2 is opened by depressing its valve stem 3, said valve will remain open even if the operator releases his grip on the actuator 11. By the same token, that valve will remain open until the operator deliberately moves the joy stick 11 to neutral vertical position or to some other tilted position.

Around the mouth of the opening 16 of the housing 6 is a flexible boot 17 made of rubber or rubber-like material, said boot being corrugated as shown and being snugly engaged with the joy stick proper to permit universal tilting movement of the latter, while in all positions, dirt and foreign matter is prevented from entering within the housing 6.

Said housing 6 is formed with a plurality of bosses 18 which are radially aligned with the respective valve stems 3 and which bosses have their axes extending inwardly and downwardly toward the axis of the ball joint formed by the spherical end 12 of the stud 10 of the joy stick 11 in the spherical socket 7. In one or more of the bosses 18 there is adjustably screwed a bushing 19 having a locknut 20 thereon, and in said bushing is an axially movable detent 21, said detent 21 having a hemispherical end as shown which is adapted to engage in the annular groove 15 of the plate 14. Said detent 21 and bushing 19 are formed with complementary collar and shoulder portions 22 and 23 respectively to limit the extent of axial inward movement of the detent under the influence of the compression spring 24 which is compressed between the collar 22 of the detent 21 and a nut 25 having threaded engagement with the bushing 19. The shank 26 of the detent 21 is threaded and has a retaining pin 27 projecting radially therefrom. In threaded engagement with the shank 26 of said detent 21 is a wing nut 28 or the like, which, in its normal position, allows the spring 24 to press the detent collar 22 against the shoulder 23 of the bushing 19.

When the joy stick 11 is tilted, as shown in dash lines in Fig. 1, the rounded end of the detent 21 will yieldably engage in the annular groove 15 of the plate 14 of the joy stick to thus retain the joy stick 11 in its tilted position where at the stem 3 of the valve 2 at the left is held in its actuated position until the joy stick is moved by the operator to disengage the detent 21 from the groove 15. When such disengagement has been effected, the valve spring 4 will restore the joy stick 11 back to its neutral vertical position.

Figure 2:
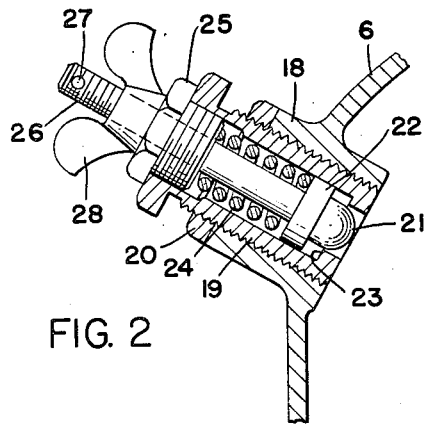
Fig. 2 is a fragmentary cross-section view showing one of the several detents withdrawn to its inoperative position.

Should it be desired to render the detent 21 associated with a particular valve 2 inoperative, it is a simple matter to tighten the wing nut 28 as shown in Fig. 2 and as evident, this will cause the detent 21 to be retracted outwardly clear of the path of the groove 15 of the plate 14 of the joy stick 11. The wing nut 28 further provides some degree of adjustability of the force with which the plate 14 of the joy stick 11 is held in any indexed, tilted position.

Figure 3:
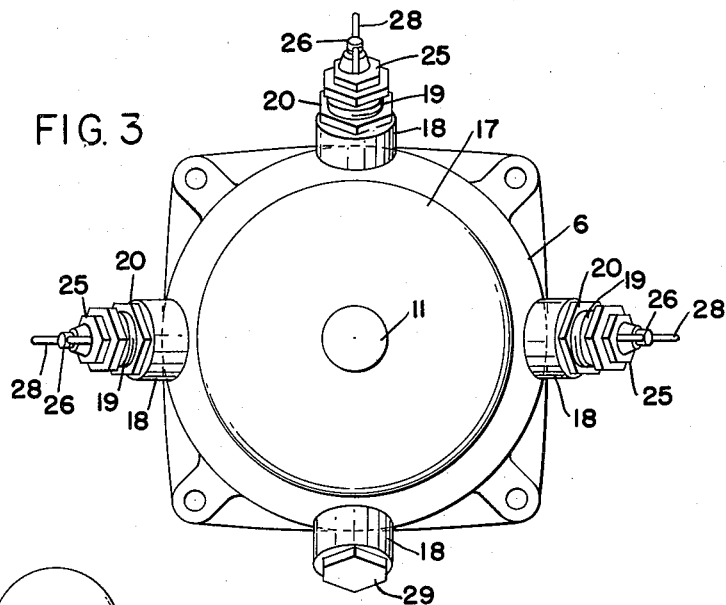
Fig. 3 is a top plan view showing three detents.

In some instances, as shown on the right-hand side of Fig. 1, and at the bottom of Fig. 3 any selected boss 18 at which indexing is not required may be provided with a plug 29.

Accordingly, it can be seen that the present invention provides an extremely versatile and simple indexing arrangement for plural valves without requiring modification of the valves themselves. Instead when any particular valve 2 is to be indexed it is a simple matter to screw in the bushing 19 as a self-contained unitary assembly. In cases, where indexing of a particular valve 2 is unnecessary there can be screwed into the associated boss 18 a plain screw threaded plug 29. Of course the locknut 20 permits accurate adjustment of the bushing 19 despite variations in the housing 6 due to casting or machining thereof.

Figure 4:
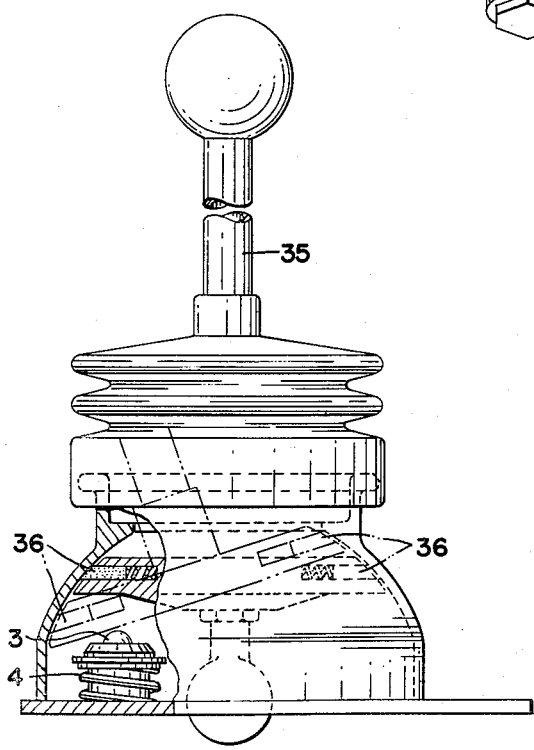
Fig. 4 is an elevation view, with parts broken away, of a modification in which the valve actuator is held in desired tilted position by plain friction means.

Referring now to Fig. 4, there is shown therein a modified form of indexing mechanism in which the valve actuator 35 is held in desired tilted positions by means of spring-loaded plungers 36 that frictionally engage the interior spherical surface of the valve housing 37. The plungers 36 are preferably made of friction material, it having been found that several plungers 36, for example, four, are entirely adequate to hold the actuator 35 at any of its several tilted positions.

Other modes of applying the principle of the invention may be employed, change being made as regards the details described, provided the features stated in any of the following claims, or the equivalent of such, be employed.

I therefore particularly point out and distinctly claim as my invention:

1. A valve indexing mechanism for actuating a circular series of valves arranged about a vertical axis each having a downwardly movable stem; said mechanism comprising a central, universally tiltable joy stick having a peripherally grooved plate, one side of which selectively engages and moves said stems downwardly responsive to tilting of said joy stick in vertical radial planes including the respective stems; and at least one spring detent that is pressed radially inwardly and downwardly toward the axis of universal tilting of said joy stick in a radial plane including one of said stems; said detent being engaged with the peripheral groove of said plate to yieldably hold said joy stick in one of its tilted positions.

2. The mechanism of claim 1 wherein means are provided to outwardly retract said detent to inoperative position beyond the periphery of said plate.

3. The mechanism of claim 1 wherein similar detents are provided in association with the remaining stems whereby said joy stick will be yieldably indexed in all tilted positions.

4. A valve indexing mechanism for actuating a plurality of valves arranged about a centrally disposed vertical axis each having a downwardly movable valve stem, said mechanism including a joy stick selectively to move said stems downwardly responsive to tilting of said joy stick in generally vertical radial planes and generally toward the respective stem, said joy stick extending centrally through a plate positioned intermediate the ends thereof secured to said joy stick for tilting movement therewith, groove means on said plate, groove engageable detent means associated with each downwardly movable valve stem and spring means yieldably to hold said groove and detent means in engagement yieldably to hold said joy stick in one of its tilted valve actuating positions, said groove means extending generally normal to the direction of tilting of said joy stick in such generally vertical radial planes and substantially toward the respective valve stem thereby to engage said valve stem associated detent means.

5. A valve indexing mechanism as set forth in claim 4 including means to withdraw said detent means to an inoperative position such that it cannot be engaged by said groove means.

6. A valve indexing mechanism as set forth in claim 4 wherein said plate is circular and said spring means is downwardly pressing yieldably to hold said detent means within said groove means.

References Cited in the file of this patent

UNITED STATES PATENTS

| | | |
|---|---|---|
| 1,162,935 | Lange | Dec. 7, 1915 |
| 1,249,755 | Holmgren | Dec. 11, 1917 |
| 1,777,580 | Russell | Oct. 7, 1930 |
| 2,026,220 | Denker | Dec. 31, 1935 |
| 2,403,519 | Gardiner | July 9, 1946 |
| 2,407,696 | Webster | Sept. 17, 1946 |
| 2,539,120 | Courtot | Jan. 23, 1951 |
| 2,552,001 | Dugas | May 8, 1951 |
| 2,656,018 | Bent et al. | Oct. 20, 1953 |
| 2,730,910 | Province | Jan. 17, 1956 |
| 2,820,372 | Edge | Jan. 21, 1958 |
| 2,852,037 | Downing et al. | Sept. 16, 1958 |

FOREIGN PATENTS

| | | |
|---|---|---|
| 1,057,241 | France | Oct. 28, 1953 |
| 1,149,441 | France | July 8, 1957 |